United States Patent [19]

Brown et al.

[11] 4,023,175

[45] May 10, 1977

[54] IMAGING SYSTEMS

[76] Inventors: Robin Charles Armstrong Brown, Odos Ieroloxiton 6, Aghia Paraskevi, Attikis, Greece; Julian Dow, 8 Avenue du Lignon, Le Lignon, 1211 Geneve, Switzerland

[22] Filed: Oct. 22, 1975

[21] Appl. No.: 624,931

[30]   Foreign Application Priority Data

Oct. 24, 1974  United Kingdom ............ 46129/74

[52] U.S. Cl. ................................ 343/17; 340/1 R; 340/5 MP
[51] Int. Cl.² ......................................... G01S 7/04
[58] Field of Search ............... 343/17, 13 R, 5 CM; 340/1 R, 5 MP, 3 C; 73/67.5 H, 67.7

[56]         References Cited
        UNITED STATES PATENTS 3,934,253  1/1976  Wiedemann et al. ............ 343/13 R
3,953,822  4/1976  Vilkomerson ....................... 343/17

*Primary Examiner*—Maynard R. Wilbur
*Assistant Examiner*—T. M. Blum
*Attorney, Agent, or Firm*—Browdy and Neimark

[57]          ABSTRACT

Echo data relating to the distance away of reflective elements of an object surface is received by an array of receivers. A signal processing device receives the data and together with information as to the range of the object surface defines equitime loci of the object surface corresponding to the data. Image elements are displayed at positions in an image plane corresponding to the intersections of the equitime loci.

24 Claims, 26 Drawing Figures

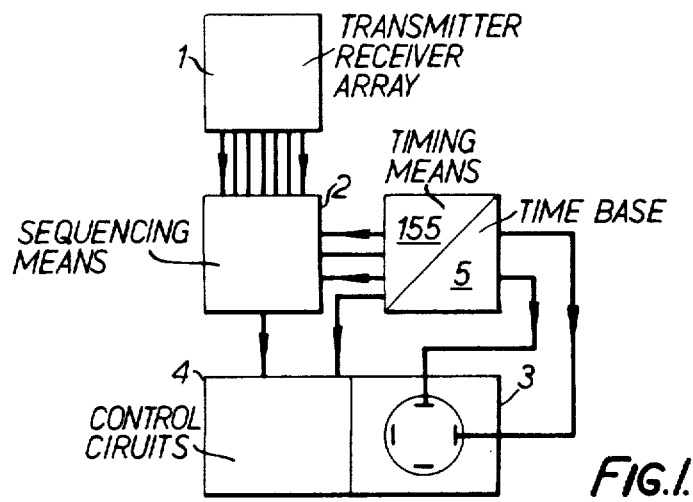
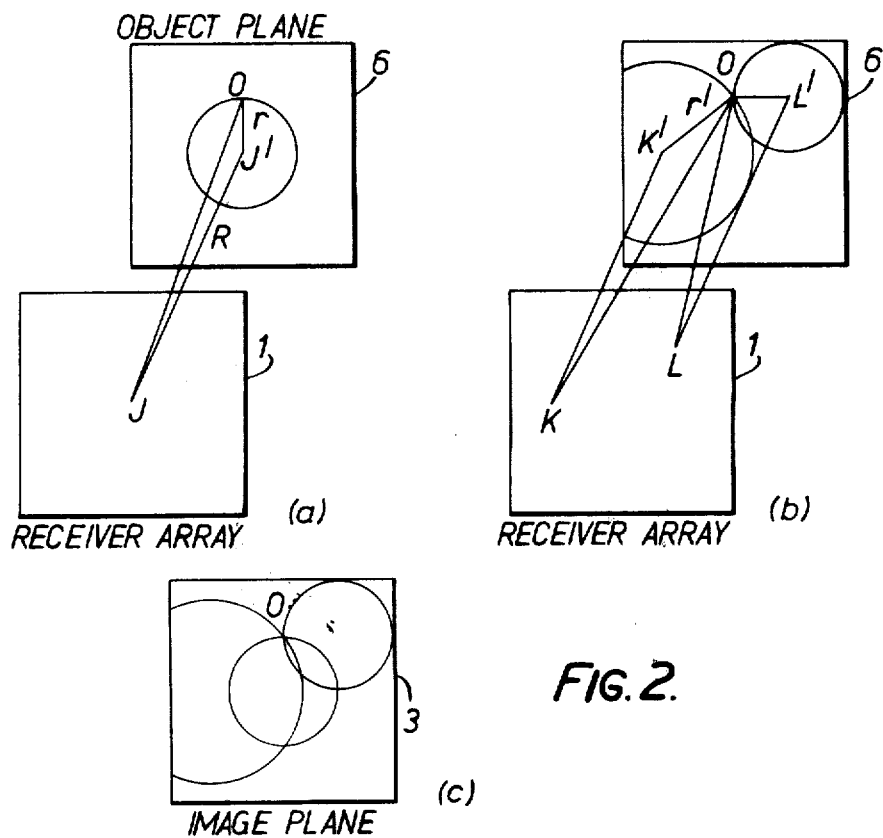

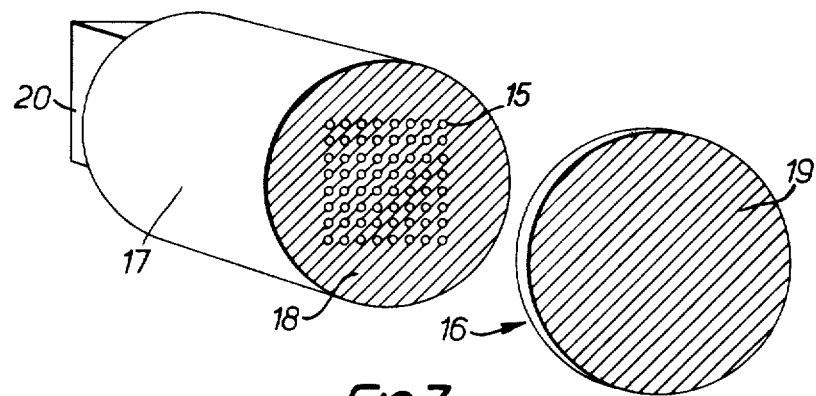
FIG. 7
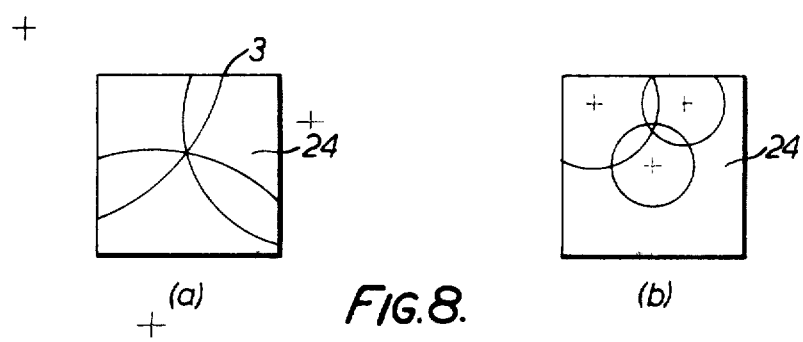
(a) FIG. 8. (b)
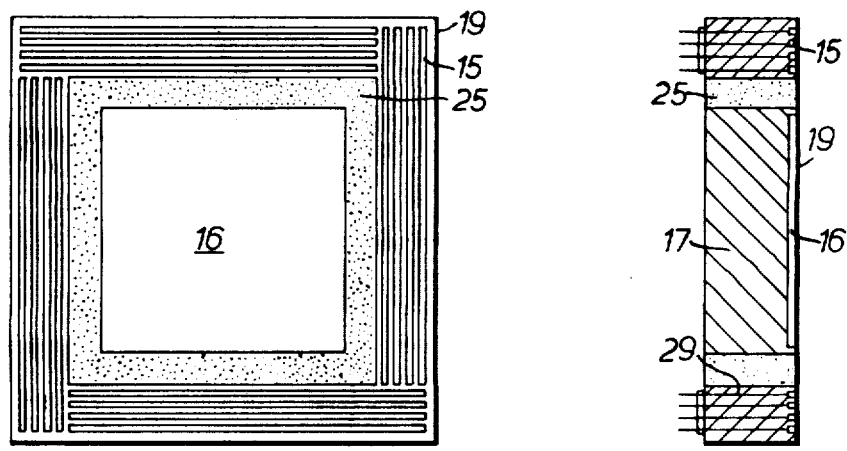
FIG. 9.

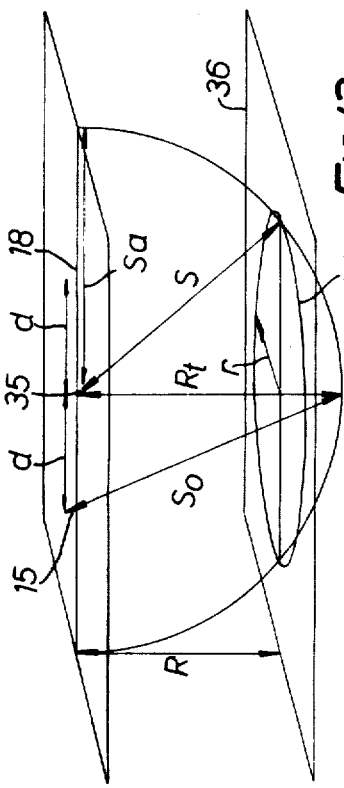

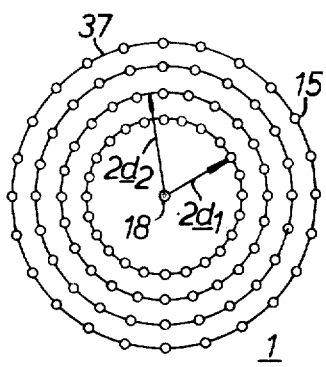
FIG.13.
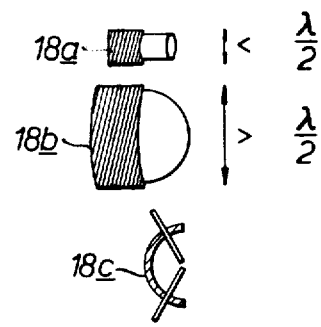
FIG.14.
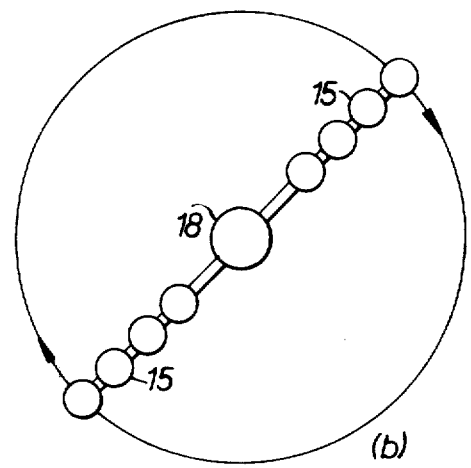
FIG.17.
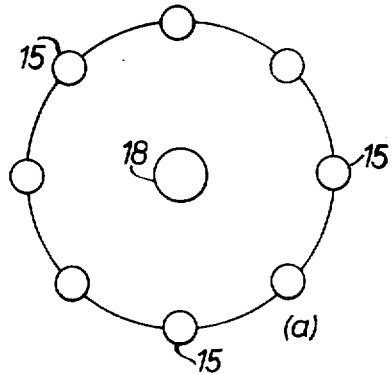

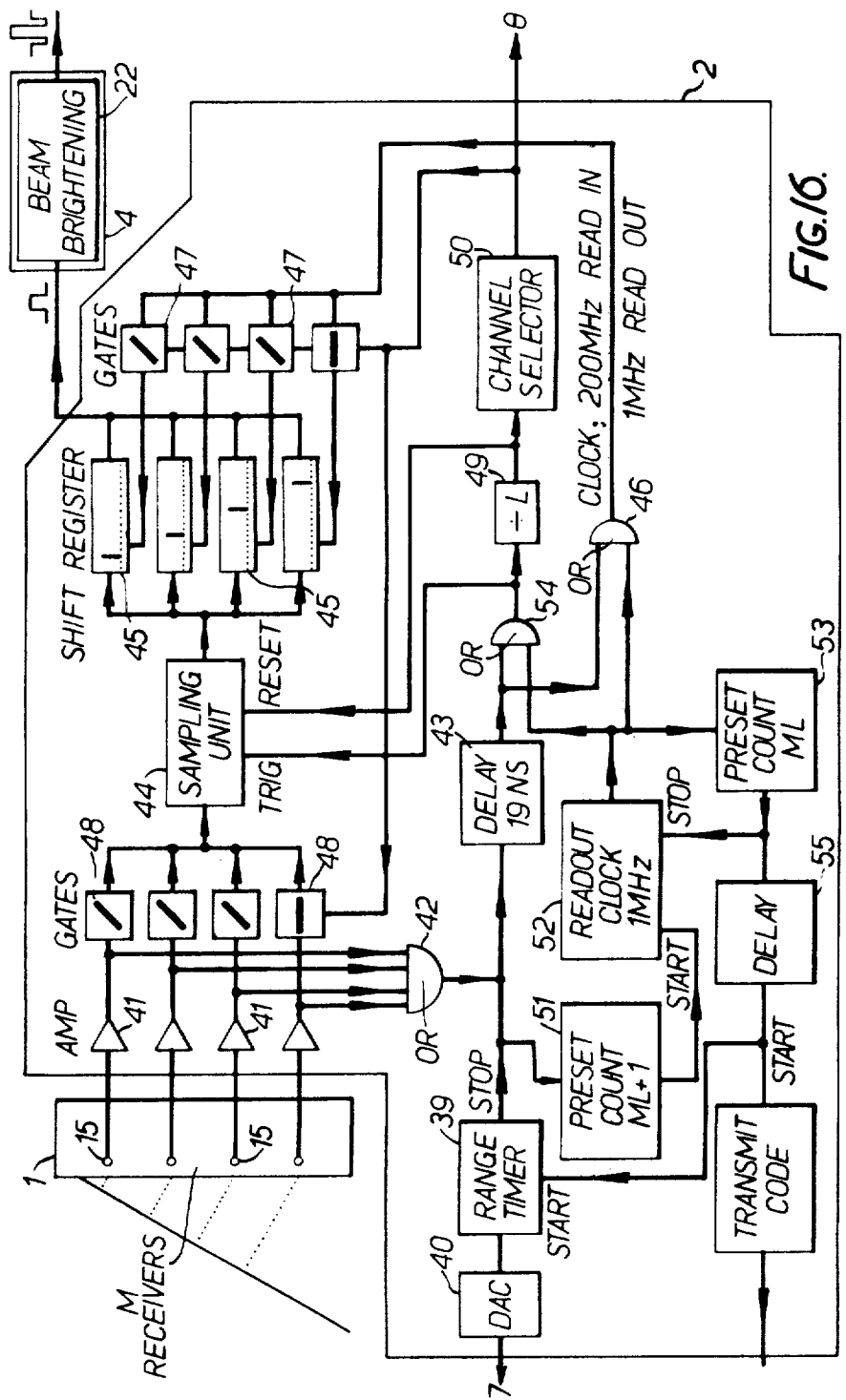

IMAGING SYSTEMS

BACKGROUND OF THE INVENTION

1. Field of the Invention

The present invention relates to an imaging control arrangement for use in imaging systems.

2. Description of the Prior Art

Many imaging techniques exist, particularly sonic systems.

The 'Pencil Beam' method, uses a single transducer (or an array functioning as a single transducer) sends a narrow pulsed beam in a certain direction. The transducer then functions as a receiver; received echoes are used to modulate the deflection (A scan) or brightness (B scan) of an oscilloscope trace. Mechanical movement of the transducer may be linked to displacements in position and angle of the oscilloscope trace, in order to produce cross-sectional images (tomographs) coplanar with the direction of the sonic beam. This technique is widely employed in medicine, in underwater sonar, and in non-destructive testing.

In Holographic methods, objects are irradiated by a continuous sound beam; the transmitted or reflected beam from the object is then caused to interfere either with another sound beam or an electronic simulation thereof, forming a hologram on the surface of a liquid or upon a photographic film. This in turn is viewed by coherent light to recover the image information.

There are Sokolov camera methods in which a transmitted or reflected sound beam falls on a piezo-electric plate forming the end face of a TV camera tube. The received sound amplitude at a spot on the tube may be read out by scanning the back face of the piezo-electric plate with an electron beam. This amplitude signal is then directly transferred to another TV screen.

In film or liquid crystal methods, the response of photographic film, or a film of a liquid crystal material directly sensitive to ultrasound, is used to form the image.

What are termed synthetic aperture methods exist. Here the object medium is irradiated in turn by a matrix of transmitters, and echo information is recorded at a matrix of receivers. This information is then reassembled numerically by a computer to form a "pulse hologram", which may be converted to an acoustic image by further computation, or by viewing the pulsed hologram in coherent light.

In Timoshin's method, a single pulse transmitter is used in conjunction with an array of receivers, whose echo-time spectrum is recorded. This total echo information is then used to reconstruct the image of a desired focal plane in object space by a process called D-conversion. D-conversion is a computational technique which may be applied after all information has been received. D-conversion considers a certain object plane element, and integrates all information which could have been reflected by that element to appear in the time trace of any receiver. An image of the object plane is built up by repeating this process element by element.

In focussed systems, the object is irradiated with a beam of sound (usually continuous), and the reflections are focussed by an acoustic lens on an image plane. This may be viewed either by a Sokolov camera or by a matrix of small piezo electric elements.

A recent development is direct ultrasonic visualisation which uses pulsed sonic irradiation, with dual acoustic lenses to form a three dimensional sonic image in a photo elastic medium. This medium is then illuminated by pulsed light, using crossed polaroids to detect areas of strain at sonic image foci.

SUMMARY OF THE INVENTION

Hereinafter and in the claims there are used statements to the effect that there is "display of image elements in the image plane"; "storage of data at all places in the image plane"; and that "patterns advance across the image plane". Such statements are to be construed as meaning that display, storage and/or advance of patterns takes place only in such a portion of the image plane as is compatible with the physical size of an imaging means.

According to the invention, there is provided an imaging control arrangement for use with a transmission-reception means for transmitting pulses, which means has an array of receivers for receiving transmitted pulses after reflection and with imaging means for displaying in an image plane representing an object surface, the imaging control arrangement having:

an input arrangement for receiving from the transmission-reception means echo signals conveying echo data relating to the distance away of reflective elements;

an output arrangement for connection to the imaging means to feed control signals thereto;

and, connected between the input and output arrangements, signal processing means for receiving the echo data and for defining therefrom, and from range information relating to the range of the object surface to be imaged, those equitime loci in the object surface corresponding to the echo data, the signal processing means being operable to produce from these defined equitime loci said control signals for the imaging means such as to cause the display in the image plane of a plurality of image elements representing reflective elements substantially in the object surface by displaying image elements at positions corresponding to intersections of these equitime loci.

The control arrangement may comprise computing means having:

a store in which is stored equation information which, in conjunction with range information relating to the range of the object surface from the transmission-reception means, defines sets of equations describing said loci;

means for determining from the range and equation information and from said echo data the intersections of those of the loci which the computing means determines as corresponding to said data;

means for determining, on the basis of the number of loci substantially at each intersection, the positions of image elements corresponding to reflective object elements substantially in the object surface; and means for producing, on the basis of the determined positions, said control signals for causing the display in the image plane of the image elements.

Alternatively, the arrangement may be operable to cause the display of image elements by causing the display in the image plane of representations of the equitime loci corresponding to the echo data so that displayed loci reinforce each other at intersections thereof, whereby the intersections correspond in positions to reflective object elements.

In one embodiment of the imaging system, given by way of example, for imaging a flat object surface, i.e. a plane, an object to be imaged is irradiated by a plane (non-diverging) pulse of pressure (e.g. sonic) or electromagnetic radiation and echoes are received by the array of receivers. Reception of an echo at one receiver causes a line to be traced on the imaging screen; this line is the locus of all points, in the desired object focal plane, at which a reflecting object might lie to give rise to an echo received at that particular instant. Such an equitime locus passes through all points in the object plane for which the total path length from the transmitter, via the object plane, to the receiver is constant. Reception of a train of echo pulses results in a series of brightened circular arcs being traced on the image screen. By repeating this process with many receivers in different positions, intersections of arcs will occur at positions on the image screen corresponding to reflecting objects in the object plane, thus causing brighter illumination of these image points. Background illumination may be suppressed by charge subtraction from the image screen, leaving a clear image.

Arcs are drawn on the image screen by an hyperbolically expanding spiral timebase, the arcs being centred upon a first set of points which, in this example are identical with a second set of points corresponding to the projected positions on the object plane of the receivers.

In this embodiment the time base arrangement synthesises a time series of voltage steps $V_r'$ ($dV_r/dt$) proportional to $$\frac{dF(u)}{dt} = F'(u) = C\left(\frac{u}{\sqrt{u^2-1}}\right), \text{ where } u = \frac{ct}{R},$$

$c$ is the velocity of the irradiating pulse propagation in the object medium, R is the range of the object plane from the transmitter/receiver array, and $t$ is the elapsed time after the object plane was irradiated. The voltage $V_r'$, when integrated, forms a smoothly varying voltage $V_r$ proportional to $$F(u) = R\sqrt{u^2-1}.$$

$V_r$ is used to control the instantaneous radius of the hyperbolically expanding spiral timebase.

In the embodiment $V'_r$ is synthesised from a series of discrete voltage levels. These are selected at times and for periods controlled by making logical combinations of submultiples of the frequency of a master clock. The master clock frequency controls the range R of the object focal plane. The range of the object plane is thus under simple electronic control, no mechanical focussing adjustment is required.

In another embodiment the imaging system may use a spherically diverging pulse of radiation. In this case the equitime locus in the object plane is elliptical. It may, however, be approximated by a circle, which may be synthesised by a modified embodiment of the time base arrangement, in which: the Range R is now replaced by the Effective Range $$R_e = \sqrt{R^2 + d^2}$$

where $2d$ is the distance from the transmitter to the receiver; the parameter $u$ is redefined as $$u = \frac{ct}{2R_e}$$

and the spirals are now centred on points in the image plane (the first set of points) halfway between the second set of points and a point in the image plane corresponding to the projection on the object plane of the transmitter.

Image resolution may be improved by controlling beam brightness so that it is at 50% in the absence of echoes, receipt of an echo causing brightness modulation up to 100% and down to 0% in such a manner that the times spent in the 100% brightness and the 0% brightness states are equal. This may be achieved either by triggering on total echo amplitude and modulating the beam brightness for equal total times to the 0% and 100% states: or by detecting the phase of echo signals at equal positive and negative thresholds, modulating 100% brightness on positive echoes and 0% brightness on negative echoes, or vice versa. The latter method preserves phase information about the reflecting object in the image, resulting in clearer images. At the completion of the echo reception cycle a uniform charge corresponding to more than the 50% brightness of a blank image, is subtracted from the entire surface of the image screen. This removes background illumination.

By reading several receiver channels simultaneously, digitising their echo content, and storing this as a time sequence in a memory device such as a shift register or a computer memory, there may be obtained: shorter read-in cycle and thus faster imaging frame rate; free choice of echo read-out rate, reducing time base accuracy problems; and improved luminosity of the image.

In summary, the above-described example embodiments take echo information directly from each receiver in turn, and store it at all places in the image plane corresponding to places of elements in the object plane from which the echo information could have originated in an object plane orthogonal to the direction of propagation of the transmitted pulse. The image is built up as the integral of this process performed with many receivers. Since echoes from the object plane are not brought to a focus at the receiver array, the signal at a given receiver does not correspond to the reflectivity of one particular element in the object plane. Rather, the image is focussed by the electronically controlled process of assembling information on the imaging screen. In the above examples this is achieved by the hyperbolically expanding spiral time base.

BRIEF DESCRIPTION OF THE DRAWINGS

For a better understanding of the invention, and to show how the same may be carried into effect, reference will now be made, by way of example, to the accompanying drawings, in which:

FIG. 1 is a block diagram of an imaging system in accordance with the invention;

FIGS. 2a to 2c are diagrams illustrating the operation of the system of FIG. 1;

FIG. 7 shows a shared-matrix sonic head, for transmitting and receiving plane waves;

FIGS. 8a and 8b illustrate the different imaging produced by shared and separated matrix systems;

FIG. 9 shows a separated-matrix sonic head;

FIG. 10 shows threshold levels;

FIG. 11 is a block diagram of a modified sequencing means of the separated matrix system of FIG. 9;

FIG. 12 shows the relationship between a best-fit circle and an ellipse;

FIG. 13 shows a transmitter-receiver array for an imaging system using spherical waves;

FIG. 14 shows spherical wave transmitters;

FIG. 16 shows sequencing means for a radar imaging system;

FIGS. 17a and 17b show transmitter-receiver arrays for radar imaging systems;

DETAILED DESCRIPTION OF THE INVENTION

Figure 3:
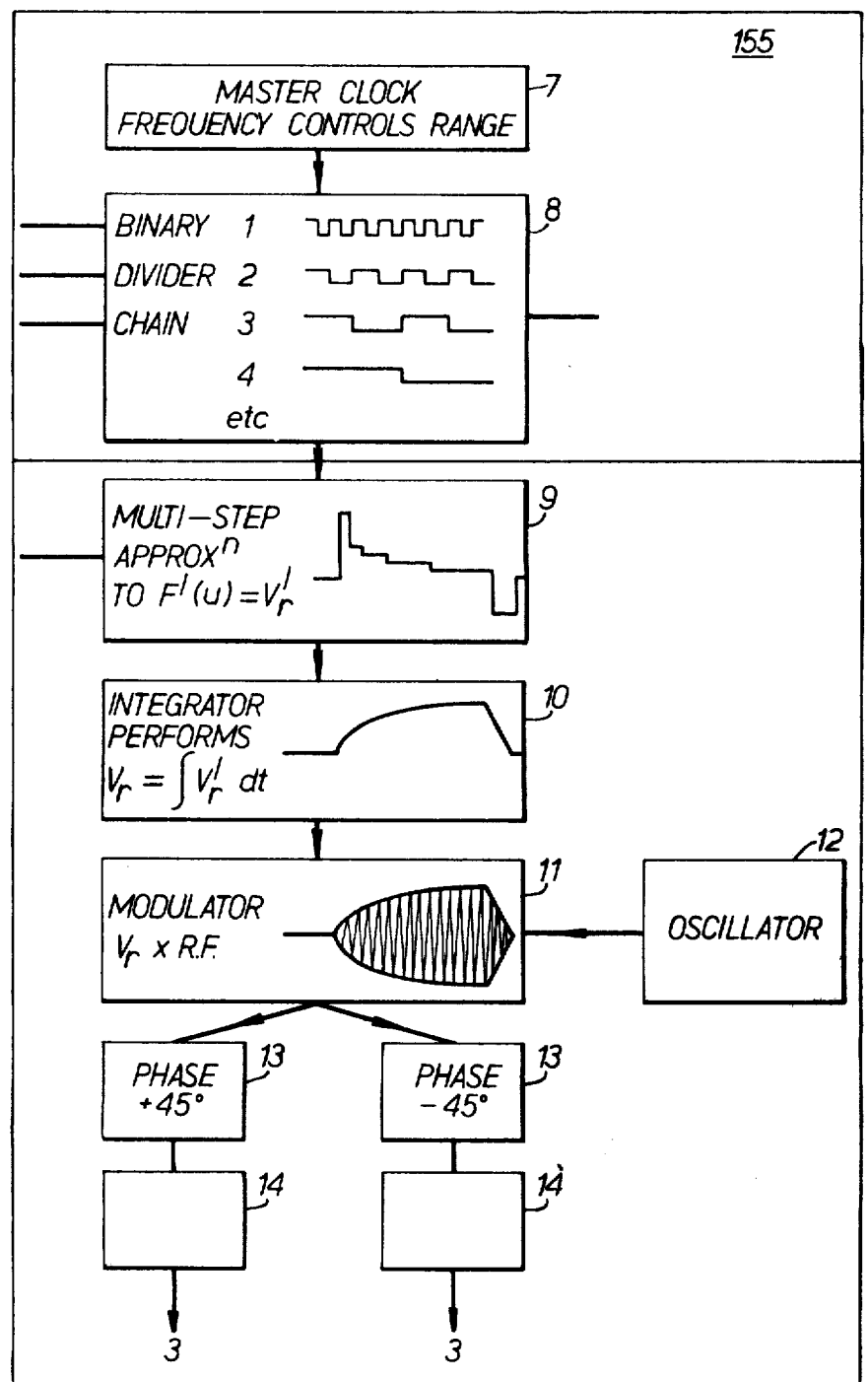
FIG. 3 is a block diagram of an embodiment of a time base arrangement of the system of FIG. 1.

The imaging system the block diagram of which is shown in FIG. 1 comprises a transmitter-receiver array 1 having a plurality of point receivers e.g. piezo-electric receivers effectively co-planar with a single transmitter for transmitting a pulse of a plane or a spherical wave. The use of only a single transmitter is a characteristic of an imaging system in accordance with the invention. The wave may be an electromagnetic wave, e.g. a microwave as used in radar, or a pressure wave, e.g. a sonic wave. Echoes from an object plane the whole of which is subjected to a transmitted pulse are received by the receivers which produce respective echo signals representing the echoes, which echo signals are fed to a sequencing means 2 for feeding the respective signals in a predetermined sequence to an imaging device 3. The object plane is orthogonal to the direction of propagation of a pulse. The imaging device 3, in this cae a cathode ray tube, is provided to produce an image of the object. The signals are read-out by the sequencing means 2 to the beam control circuitry 4 of the cathode ray tube 3. A time base arrangement 5 controls the scanning of the cathode ray tube, there being a timing means 155 which coordinates the operation of the sequencing means 2 with the scanning. The time base arrangement causes the beam of the C.R.T. to scan spirally about respective ones of a plurality of points on the C.R.T. screen corresponding to the array of the receivers. Each spiral expands as a hyperbolic function of time. The system is operable to produce an image of a plane extending transversely of the direction of propagation of the transmitted wave, i.e. in a plane parallel to the plane of the array of receivers.

The operation of the system is as follows. Let it be assumed that there is to be produced an image of an object plane at a certain distance R in front of an extended flat pressure wave or sonic transmitter, using sound echoes arriving at an array of point receivers co-planar with the transmitter. Referring to FIG. 2, consider the signals arriving at a single receiver J. An echo received at a given time at a single receiver cannot be assigned to a unique element in object space; however a surface containing the reflecting element can be defined. This equitime surface intersects the object focal plane in an equitime locus, which will be a circle (in the case of a plane insonifying wave) or an ellipse (in the case of a spherically expanding wave). The first echo to arrive from the object plane will come from the point J' in the object plane 6 closest to the receiver J, (FIG. 2a), and will arrive at a time T equal to R/c (where c is the velocity of sound in the object medium), after the transmitted pulse reached the object plane. An echo from an element O lying in the object plane at a distance r from J' will arrive at the receiver J at a time $t + \Delta t$. Signals received with a delay $\Delta t$ can originate from any object element lying at a distance r from J'. The time base arrangement 5 causes the generation of a pattern on the image screen as follows: At a time 2T after the transmitted pulse the cathode ray tube electron beam starts to draw a spiral about the position of J'. (FIG. 2a). The echo signal from object O arriving after delay $\Delta t$ modulates the beam brightness, causing a bright spiral orbit substantially of radius r to be drawn. The process is then repeated using a different receiver K (FIG. 2b). The time base now spirals around K', and there is drawn on the screen a bright spiral orbit substantially of radius r' corresponding to the distance of O from K'. The resulting pattern on the screen is now two intersecting orbits: one of the intersections corresponds to the position of O. Many repetitions of this operation (FIG. 2c) results in a large number of bright orbits all reinforcing each other at the true position of O in the image, and forming a statistically varying lower level background elsewhere on the image screen. This background may be subtracted out or otherwise technically suppressed.

It can be shown that the relationship between the time t the elapsed time after the object plane was irradiated and r, the radius of an equitime circle is given by equation 1:

$$\frac{t^2}{T^2} - \frac{r^2}{R^2} = 1 \text{ where } T = R/c \qquad (1)$$

Thus the spiral orbit expands as the hyperbolic function $$F(u) = R\sqrt{u^2 - 1}$$

where $u = ct/R$ is a dimensionless parameter and R is the range from the transmitter to the plane to be imaged.

In an imaging system according to the invention, it is echo delay that is the significant information for producing an image of an object plane and not signal amplitude alone. The imaging system described hereinabove with reference to FIG. 2 transfers received echo information into the image plane by an electronic process, without computation, the image being formed in real time.

A block diagram of an embodiment of the time base arrangement 5 is shown in FIG. 3. The embodiment comprises timing means 155 having a free-running master clock 7 for producing a pulse train of repetition rate which is a multiple of $1/u$, and a chain of binary dividers 8. The repetition rate of the pulses of the pulse train is counted down by the chain of binary dividers 8. Logical combinations of the outputs of the dividers 8 are made in a derivative forming circuit 9. The circuit 9 produces a voltage $V'_r$ representing a multi-step approximation to the derivative $F'(u)$ of $$F(u) = R \sqrt{u^2-1}$$

$$F'(u) = \frac{dF(u)}{dt} = c \left( \frac{u}{\sqrt{u^2-1}} \right)$$

Figure 4:
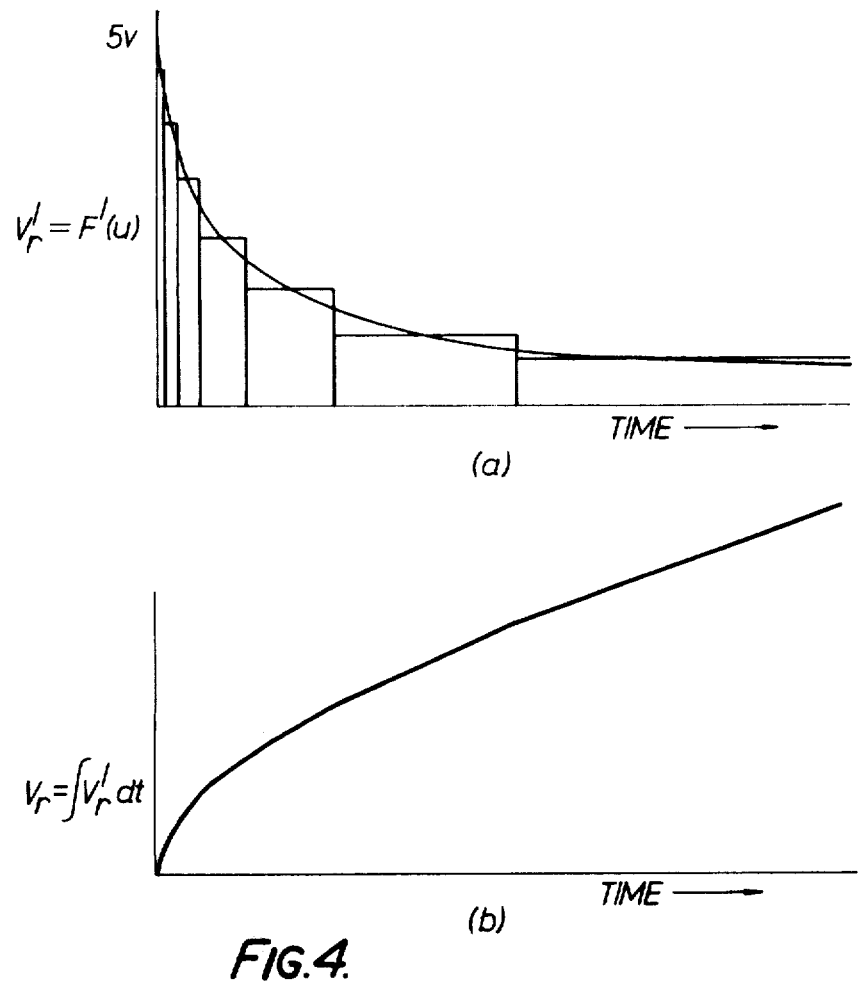
FIGS. 4a and 4b are voltage-time diagrams of voltages occurring in operation of the arrangement of FIG. 3.

An integrator 10 receives from the circuit 9 during each interval the voltage $V'_r$. The variation of $V'_r$ with time is shown in FIG. 4a. During each interval a discrete voltage $V'_r$ is switched to the input of integrator 10. The output of the integrator 10 rises as $V_r$ proportionally to $F(u)$ as shown in FIG. 4b. During the last time interval a large negative voltage resets the integrator to zero at the end of the expansion sequence. The output of the integrator is fed to a modulator 11 to amplitude modulate a high frequency sine wave produced by an oscillator 12. The frequency of the sine wave is chosen so that, on the image screen, two or more orbits are drawn per imaged sonic wavelength increase in radius of the spiral. The modulated sine wave is now passed through phase shifters (13), of +45° and −45° respectively, to the horizontal and vertical deflection plates of the cathode ray oscilloscope.

DC voltages are added to centre the spiral over the projected position, on the object (image) plane, of the selected receiver whose echoes are being received. These voltages are generated by positioning circuits 14, driven by the lower frequencies of the divider chain (8).

In addition to the use described hereinbefore, the outputs of the chain of binary dividers 8 are used in logical combinations to generate the delay 2T from the transmission pulse to the commencement of spiralling about a point on the image screen and to control the sequence in which signals from the receiver array are selected and displayed.

Figure 5:
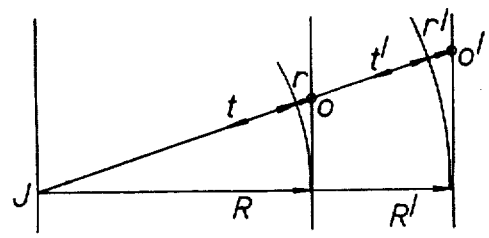
FIG. 5 is a diagram showing the relationship between the range of object planes from a transmitter-receiver array of the system and transmitted wave propagation time.

The frequency of the master clock may be used directly to control the range R. From FIG. 5 it is clear that for the two ranges R, R', $$R/R' = r/r' = t/t',$$

where $t$ and $t'$ are elapsed real times. The ratio $R/R'$ is made to correspond to a constant number of clock cycles by decreasing the frequency of the clock in the proportion $R/R'$. The clock may be regarded as counting in units of the parameter $u$. It is necessary only to synthesise correctly $F'(u)$ at one range R, where clock time and real time correspond. Since $u$ is an independent dimensionless parameter, $F'(u)$ is then correct for all R. Slowing down clock time by increasing the length of unit $u$ by a multiplying factor $R'/R$, automatically starts the spiral scanning at the new range R', while integration of $F'(u)$ will produce the correct variation of radius $r'$ in real time.

The range R may be continuously varied by electronically varying the frequency of the master clock. Thus automatic scanning of an object may be achieved.

Figure 6:
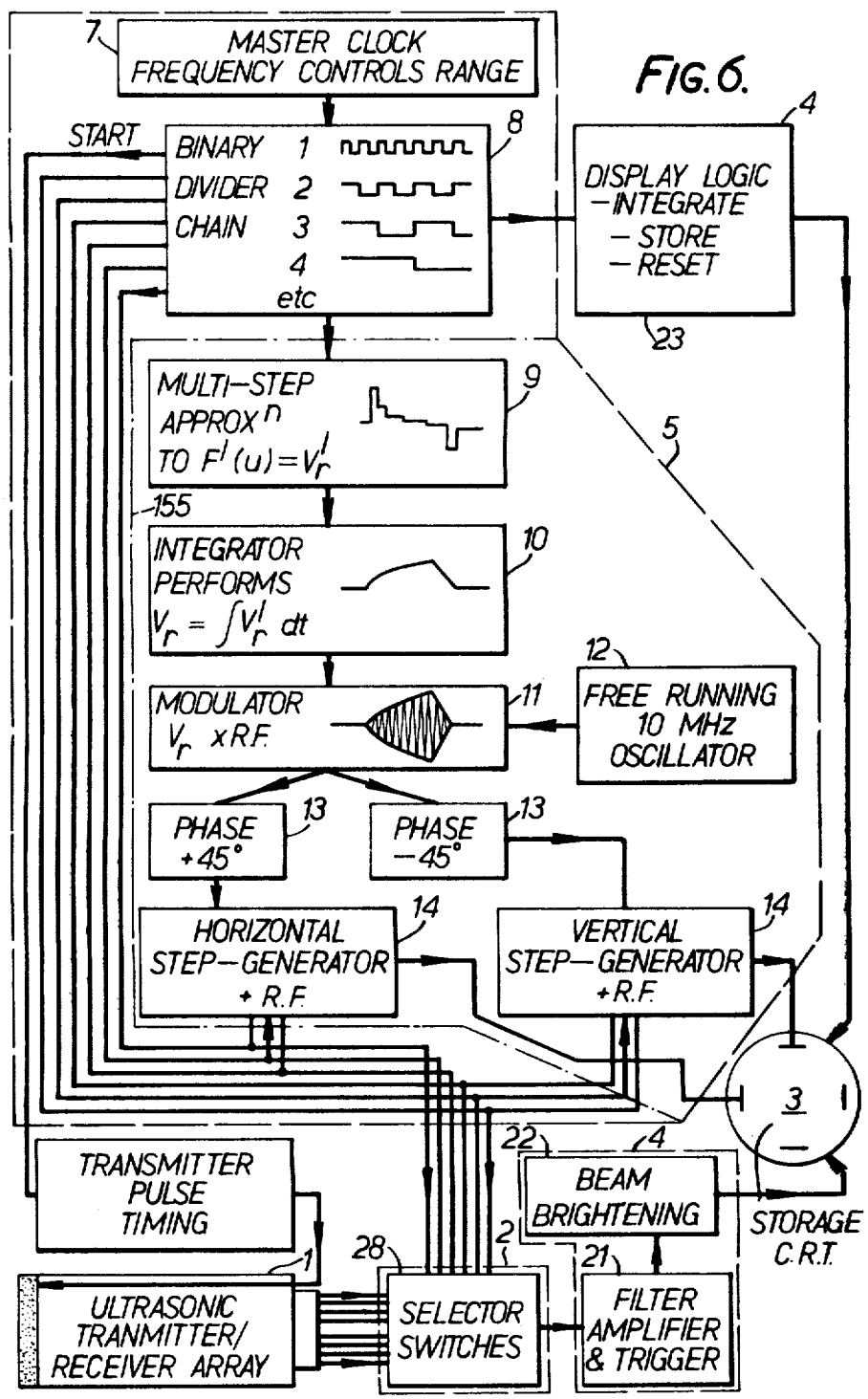
FIG. 6 shows an embodiment of a sonic imaging system in accordance with the invention, in which plane waves are used.

An embodiment of a sonic imaging system in which plane waves are used is shown in FIG. 6.

In this embodiment, the transmitter-receiver array 1 may comprise a sonic head as shown in FIG. 7. The head comprises an array of piezo-electric transducers constituted by receiver elements 15 which are small areas on the surface of a piezo electric crystal 16, which also serves as the transmitter. An array of contacts is brought to the required locations of the receivers; these may be direct ohmic contacts to the back face of the crystal itself, or dielectric contact areas on the surface of an acoustic backing 17 for the crystal. The transmitter electrode 18 is insulated from the receiver areas. It comprises either the rest of the back surface of the crystal, or a corresponding area on the acoustic backing 17. When the transmitter/receiver surfaces are formed on the acoustic backing, as in FIG. 7, acoustic and dielectric contact is made by introducing a high dielectric glue, or a high viscosity and high dielectric constant fluid (e.g. glycerine) between the crystal and the backing material.

The front face of the crystal serves as a common electrode 19 for both the transmitter and receiver systems. Receiver contacts are brought to a connector block 20, via which it is connected to an array of a plurality of selector switches constituting the sequencing means. These switches may be mounted either in the sonic head or in the main apparatus frame. A system using such a sonic head in which the array of receiver elements is contained within the area of a large plane transmitter is known as a shared matrix system.

The time base arrangement 5 and timing means 155 are constructed and operate as described with reference to FIG. 3. The outputs produced by the dividers of the chain 8 which are of the lower frequencies used to drive the positioning circuits 14 are also used to drive the selector switches 28 of the sequencing means 2. If, for example, an 8 × 8 array of 64 receivers is used, a 17 stage divider system is required. Steps 1 to 7 synthesise $F'(u)$, step 8 provides the integrator reset, steps 12 to 14 generate successively 8 positions in one horizontal row of receivers and steps 14 to 17 generate the 8 rows.

After being selected, the signal from the selected receiver is fed to the beam control circuitry 4 in which it passes through a filter 21 to eliminate unwanted frequency components, then is amplified (21) and used to drive a monostable circuit (21), whose output controls the beam brightening circuit (22) of the cathode ray tube 3.

The beam is gated off at all times except during the reception of echoes from the object plane.

Display logic (23) of the beam control circuitry 4 holds the screen in the mode to integrate the received charge during the reception of echoes, then to store the image after all receivers have been selected. Alternatively the sequence may be repeated after a variable interval, or the oscilloscope may be left in the non-storage mode and the pulsing sequence may be left free-running. The image is then integrated by the eye of the observer.

The time between pulses is chosen to be several times longer than the propagation time of sound from the transmitter to the receivers via the object plane, allowing time for multiple path echoes to die away. In a system working with R ≈ 10 cms, a suitable delay between pulses is about 1 msec, resulting in a pulse repetition rate of 1 KHz: with 64 receivers this gives a frame rate of about 15 frames per second.

As an alternative to the shared matrix system of FIGS. 6 and 7 a separated matrix system may be used.

In this system, the sonic head comprises an array of receivers which lie coplanar with, but outside the area of, a large plane transmitter. With such an arrangement the projections of the receiver position onto the object plane fall outside the imaged area. As a result, the orbits imaging a particular object element intersect only as the corresponding position of the object element in the image plane as shown in FIG. 8(a). This results in a lower level of background than with the shared Matrix geometry as can be seen from a comparison of FIG. 8b with FIG. 8a. In FIG. 8a each + denotes the projected position of a receiver. Each + falls outside the imaged area 24. In FIG. 8b each + denotes the projected position of a receiver. Each + falls inside the imaged area 24. Transverse resolution in the object plane is improved; since with this geometry an object element is never directly in front of a receiver, a transverse displacement of the object element will result in marked difference in the arrival time of the corresponding echo. (This is not the case for an object element close to the projected position of a receiver in the Shared Matrix Geometry). The separation of the transmitter and receiver elements permits the use of a transmitter without any interruptions across its surface, and also permits separate optimisation of the receiver elements for frequency and directional sensitivity.

A Sonic Head of the type for use in a separated matrix system is shown in FIG. 9. It comprises a large plane crystal 16 which forms the transmitter. This is backed by an acoustic backing material 17 and separated acoustically from the receiver array by an acoustically inert layer of low density material 25. The receiver elements 15 are arranged in a linear (or circular) array coplanar with the transmitter, and are mounted on, or cast in, an acoustic backing material 17. Individual ohmic or dielectric contacts 29 are made to the back face of each receiver element, and brought to a multi-wire connection block behind the acoustic backing material. The front face of the transmitter crystal is connected to the front faces of all the receiver elements to form a common earth electrode 19, which together with the rest of the external enclosure of the sonic head provides an electrostatic screen for the low level received signals.

The timing means and time-base arrangement for the formation of the hyperbolically expanding spiral time base signal may be identical to the arrangement 5 described with reference to FIG. 3. The system may be modified, however, by the inclusion of parallel read-in of echoes from several receivers simultaneously, and conservation of phase information in the received echo signals.

Since the number of receiver elements is not limited by compatibility with the transmitter dimensions as in a shared matrix system, the number of receivers may be increased considerably over that possible with the shared matrix system: this increases the resolving power of the system when imaging complex objects. However, sequential processing of echoes from a large number of receivers will lengthen the time required to complete a single image frame. To reduce this effect, parallel processing is performed in a modified sequencing means 2. Referring to FIG. 10, echo information is digitised as positive (above a positive threshold 26), negative (below a negative threshold 27 of equal magnitude) or zero. A modified sequencing means 2 is shown in FIG. 11. It comprises an array of selector switches connected to receive echo signals from the receivers representing echoes and to receive control signals from the chain binary dividers 8 of the control means for controlling the sequence of signals. The echo signals are fed to a filter and amplifier circuit 129 and passed via a digitiser 30 to shift registers 31.

A sequencing unit 32 and a clock 33 are provided for controlling reading in and reading out of the digitised echo signals to the shift registers. The digitising operation is performed on the output of several receivers simultaneously: the encoded (+, 0, −) echo information of each echo signal is stored as a time sequence in a shift register for each receiver channel. During the reception of echoes the shift registers are advanced at a clock rate two or more times the frequency of the sonic waves, in order not to lose time resolution. After the parallel read-in of information, the clock 33 is advanced more slowly under the control of the sequencing unit 32, which reads-out the contents of each shift register in turn to control the beam brightening 22 of the cathode ray tube 3. Thus the system provides parallel read-in, and serial read-out.

The beam brightening circuit normally operates to display 50% brightness in the absence of echoes: for positive + echo information the beam brightness increases to 100%; for negative − echo information the beam brightness is reduced to 0%. After the completion of an image frame a uniform level of charge is subtracted from the entire image, exceeding the 50% brightness level of a blank image. This operation is performed by the display logic 23 controlling the cathode ray tube flood gun.

With parallel read-in of $n$ channels the image formation time can be reduced by $n$. Serial read-out of the $n$ stored echo patterns permits a free choice of the read-out speed of the stored information. The read-out speed may be chosen so that the oscillator 12 can run at a reduced frequency. This can reduce harmonic distortion which reduces the spiral fidelity and consequently the imaging resolution. The number $n$ of channels and the frequency of the oscillator 12 may be chosen so that the read-out of $n$ echo patterns occupies the entire time from one sonic pulse to the next. The "beam on" time can be increased thereby from around 1% to nearly 100% of the total imaging time: enabling image luminosity to be improved and/or the oscilloscope beam current reduced with gains to the writing spot size.

By discriminating on positive and negative echoes, the phase information in the received signal is retained. This enables a transverse resolution of about 1.2 wavelengths in the object plane. This transverse resolution is substantially independent of screen sensitivity.

For certain sonic imaging applications, such as large scale or long range imaging, it may be impractical or uneconomic to use plane wave insonification. In these circumstances a spherically diverging pulsed wave front may be employed to irradiate the object plane. The equitime locus in the object plane is in such a case, an ellipse. This ellipse has its major axis parallel to the line joining the transmitter to the receiver. Referring to FIG. 12, under most circumstances the equitime ellipse can be satisfactorily approximated by an equitime circle 34 centered on the projection of a point 35, halfway between the transmitter 18 and the receiver 15, on the object (image) plane 36. The error between the "best fit" equitime circle and the equitime ellipse varies sinusoidally around the ellipse. To generate the best fit circles, the control means 5 generates a signal causing scanning to take place according to the hyperbolic law plus half the error.

Referring to FIG. 12, it can be shown that the relationship between the time $t$ for a wave to travel from source to receiver via any point on the equitime surface and $r$, the minor semi-axis of the equitime ellipse on the focal plane, may be written by replacing in equation 1, $$R \text{ by } R_e = \sqrt{R^2 + d^2} \text{ and } T \text{ by } T_e = \frac{2 R_e}{c},$$

where $2d$ is the distance between the transmitter and receiver, to give equation 2

$$\frac{t^2}{T_e^2} - \frac{r^2}{R_e^2} = 1. \tag{2}$$

Thus, the spiral orbits expand hyperbolically. However, neither $R_e$ nor $T_e$ are constant values (as was the case for plane wave illumination) since they are both functions of $d$. So, for every value $d_1, d_2 \ldots$ of $d$, the time base must expand according to a different law and start at a different time relative to the irradiating pulse.

We can use the same principle of synthesis for $V_r$ as is used for plane wave irradiation described hereinbefore, but the period of the master clock 7 must be changed for every value of $d$ which is processed during a complete cycle. Radially symetric geometry in the receiving matrix, using as few rings of receivers 15 as possible, gives the simplest arrangement. Although the simplest solution is one ring, one ring results in an oscillatory distribution of luminosity around an image element. Four rings situated suitably, however, are sufficient to damp the oscillations considerably. The receivers 15 are arranged in circular arrays of radius $2d_1, 2d_2 \ldots$ around a central spherical wave transmitter 18 as shown in FIG. 13.

An embodiment of the transmitter/receiver array for use with a spherical wave transmitter is shown in FIG. 13. Spherical wave transmitters suitable for use in the array are shown in FIG. 14. The transmitter 18 is mounted at the centre of the array 1. The transmitter may take the form of: 18a, a piezo-electric or magneto strictive disc or cylinder whose diameter is less than one half wavelength; 18b, a piezo-electric hemisphere or spherical cap whose focus coincides with the array centre; or 18c, a liquid filled spark-gap pulse generator.

Receiver elements 15 are individual piezo-electric crystals tuned to the frequency of the transmitter. Receivers are disposed in circles of radius $2d_1, 2d_2 \ldots$ mounted on a supporting framework 37. Transmitter and receiver elements are mounted on acoustic backing material. In order to optimise the system resolution, the aperture (measured in wavelengths) of the receiver array is maximised by choosing the highest possible operating frequency.

Figure 15:
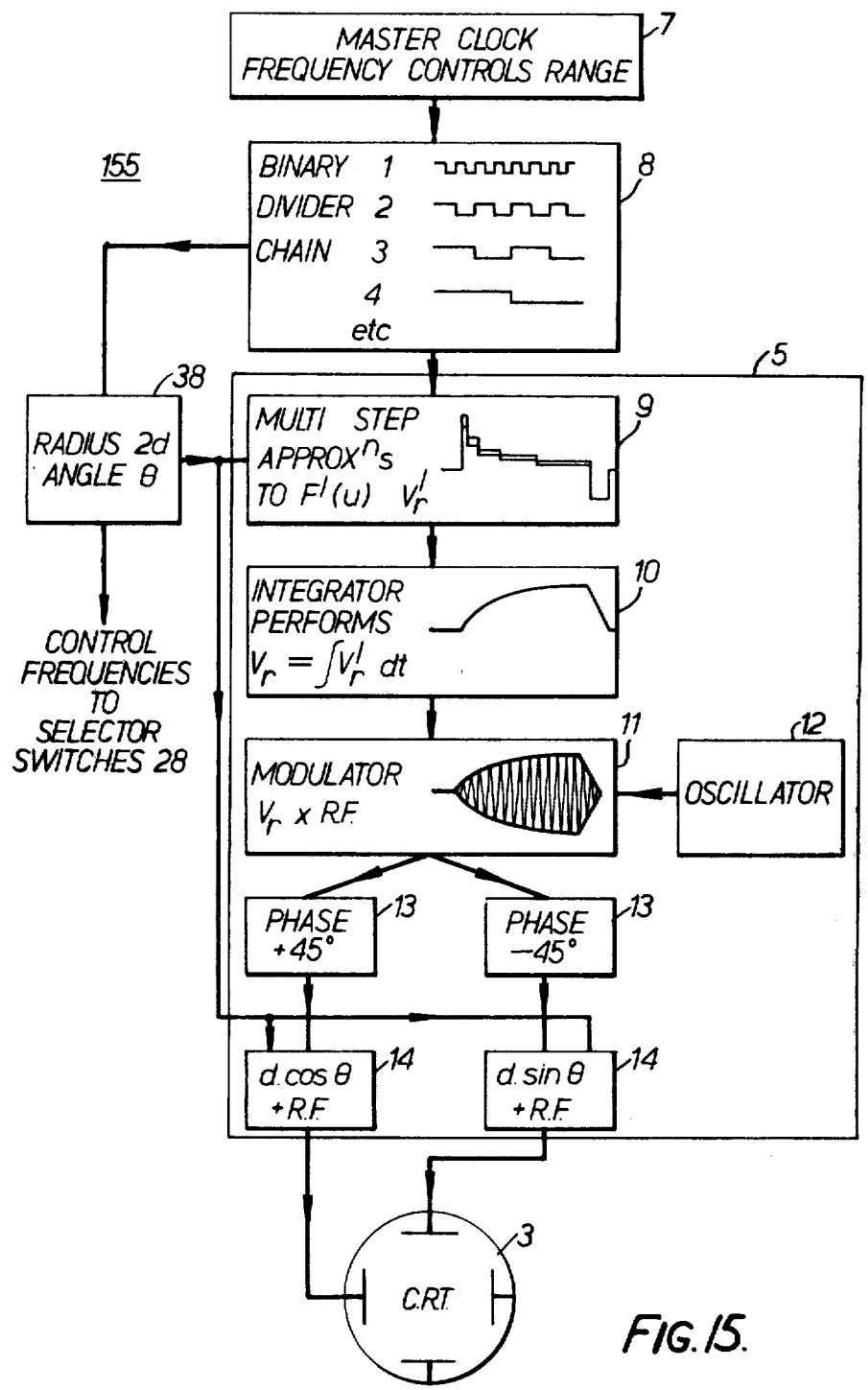
FIG. 15 is a block diagram of a time-base arrangement for a system using spherical waves.

The sequencing means 2 for the spherical wave system is identical to that described above for the separated matrix system with reference to FIG. 11. The timing means 155 and time base arrangement 5 are shown in FIG. 15, being modified versions of the timing means 155 and time base arrangement shown in FIGS. 3 and 6. As before, the master clock 7 runs at some multiple of the frequency $1/u$, and generates a train of pulses which is divided down by a binary divider chain 8. Logical combinations of the higher frequency outputs of the chain 8 are used to synthesise a multistep approximation to $V'_r$ in a derivative forming circuit 9 appropriate in amplitude and timing to the first ring of receiver elements 15 arranged at radius $2d_1$ around the transmitter 18. This is then integrated in an integrator 10 to produce $V_r$ proportional to the instantaneous radius of the spiral. $V_r$ is now used to modulate by means of a modulator 11 the output of an oscillator 12. The modulated waveform is subject to phase shifting of $+45°$ and $-45°$ in phase shifters 13. The position of the spiral centre, corresponding to the projected position of the selected receiver on the object (image) plane, is derived from logical combinations formed in a logic circuit 38 of the lower frequencies from the divider chain 8. The circuit 38 also produces selector control signals which define the radius $2d$ and angular position $\theta$ of the receiver in use. These selector control signals are used to control the selector switches 28. The centre of a spiral must be halfway between the projected positions of the transmitter and receiver. To do this $x$ and $y$ DC position voltages proportional to $d \cos \theta, d \sin \theta$, are added to the modulated voltage in positioning circuits 14. The phase shifted modulated signals are then applied to the $x$ and $y$ deflection plates of the cathode ray tube 3. Upon completion of imaging with the first ring of receivers, the circuit 38 switches a new multistep approximation to $V'_r$ appropriate in timing and amplitude to the next ring of receivers, and so on until the image cycle is complete.

An embodiment of a radar imaging system will now be described with reference to FIGS. 1, 15, 16 and 17.

The radar imaging system comprises: a transmitter/receiver array 1 which may be as shown in FIG. 17(a) or FIG. 17(b); sequencing means 2 as shown in FIG. 16; a timing means and time base arrangement as shown in and described with reference to FIG. 15; and beam control circuitry 4 and a cathode ray tube 3.

Referring to FIG. 17, the transmitter 18 is arranged at the centre of a circular array of receivers. The transmitter produces a spherically diverging wavefront the focus of which is at the centre of the array, over a lobe of aperture $\pm \alpha°$; resulting in an irradiated zone of diameter $\phi = 2R \tan \alpha$ on the object plane at range R. To produce an image resolution of L lines $$d = 1.2 \lambda\, RL/2\phi$$

where $\lambda$ is the wavelength of the radiation and $4d$ the diameter of the receiver array.

In order to maximise the system resolution without using very large array dimensions, the radar wavelength is chosen to be about $\lambda = 1$ cm or less.

For imaging single element (N = 1) objects as a single image point, number M = 8 of receivers is sufficient. As shown in FIG. 17a, M = 8 receivers 15 are arranged in a circular array around the transmitter 18. For imaging of more complex objects, a larger number of receivers is required. This may be achieved by scanning one or more receivers on a moving radial arm about the transmitter position. FIG. 17b shows M = 8 receivers 15 mounted on a double arm.

The timing means and time base arrangement is similar to that used for the spherical wave sonic imaging system: see FIG. 15. However, since the range R≫ d, it is not necessary for long range work to use the "effective range"

$$R_r = \sqrt{R^2 + d^2}.$$

Thus only one multistep approximation to F'(u) is provided by the derivative forming circuit 9, $$u = ct/2R$$

Referring to FIG. 16, for each image frame cycle, the transmitter 18 sends a train of (ML + 1) pulses. Each pulse is as short as possible, and pulses are separated by a convenient interval: say 20 nonoseconds, n s. Sending of the first pulse starts a Range Timer 39, which is stopped by the receipt of the first echo. The timer 39 counts the time between transmission and receipt and this count is converted to an analogue voltage by an D-A converter 40 to control R, the range, by controlling the time base master clock 7 of the arrangement 5 (see FIG. 15).

Each of the M receivers 15 is connected to a microwave amplifier 41: all amplifier outputs are fed in parallel to an OR gate 42 with a dead-time of about 2 $t_r$ (e.g. 10 ns) where $t_r$ is the time interval in which information can be received; $t_r$ = (4dsin α)/c. The OR gate 42 gives a timing output pulse when the echo reaches the first receiver; this timing pulse is then delayed by 19 ns in a delay line 43 and acts as a trigger to start a sampling timing unit 44. At each timing pulse the sampling unit steps forward one 50 ps interval. Initially the sampling unit examines the signal from a first receiver channel. If an echo signal is found, the sampling unit sends a binary 1 bit to the input of a shift register bank 45; if no echo is found binary 0 is sent. The delayed timing pulse from the delay line 43 supplies via an OR gate 46 the clock signal to advance the shift registers. Channel control gates 47, 48, select the input from the required channel to the sampling unit, and simultaneously switch the clock pulses to the corresponding shift register. Delayed timing pulses from the delay line 43 are counted down in a "divide - by - L" circuit 49 (L = 100, for example), the resulting pulses advance a channel selector 50 which selects gates 47, 48. The same pulses reset the sampling timing unit to 50 ps interval 1 at the beginning of each channel scan.

When (ML + 1) timing pulses have been received a preset counter 51 signals the end of the read-in cycle, by sending a pulse to start a read-out clock 52. This now runs at 1 MHz, feeding the shift register clocks via the OR gate 46 and driving the channel selector 50 via an OR gate 54, in just the same manner as the input timing pulses. After ML read-out pulses have been counted another preset counter 53 stops the read-out clock and re-starts the transmitter cycle.

The output pulses from the shift registers are fed to the beam brightening control circuit 22 of the C.R.O. For each 1 μs input 1 bit the beam brightening circuit sends 1 μs 100% beam preceded and followed by 0.5 μs 0% beam before reverting the 50% beam corresponding to a 0 bit input. (This ensures sharp resolution of single point images).

In order to allow time for resetting the time base integrator and recentering the spiral for a new receiver position, a suitable delay 55 is introduced between the stopping of the read-out cycle and restarting the transmit cycle.

The output of the channel selector (50) serves as the θ input to the spiral centre coordinate generators or positioning circuits 14 (see FIG. 9) in the time base arrangement 5.

The image resolution of the spherical wave imaging system is the function of four major factors:
 i. Picture Resolution of the Image Screen,
 ii. Linear Object Resolution,
 iii. Receiver Array Resolution, and
 iv. Statistical Object Resolution.

The choice of design parameters such as array dimensions, pulse wavelength, number of parallel read-in registers, and frame rate, result from a compromise which may be optimised according to the nature of the object to be imaged.

Image screen picture resolution is defined as the number of lines L resolved across the image screen.
 L = ½.(n° of spiral orbits drawn per channel) L may be chosen arbitrarilly.

Figure 18:
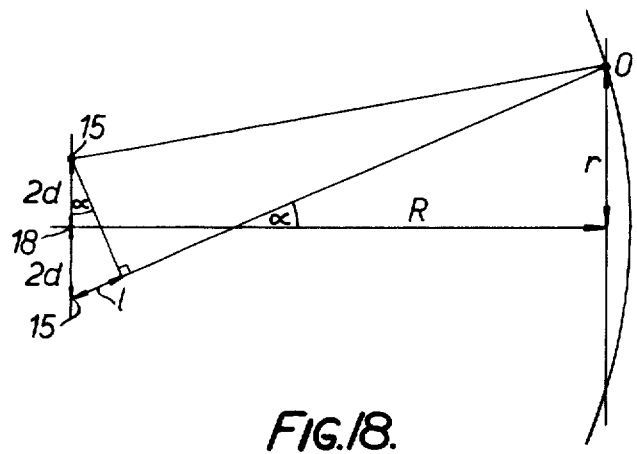
FIG. 18 is a diagram illustrating receiver array dimensions.

In regard to linear object resolution, it can be shown that the limiting diameter D of a point object, or the minimum separation which can be resolved between two point objects, is, referring to FIG. 18, $$D = 1.2\lambda R/r \text{ where } R > r$$

The distance D corresponds to one resolved line in the object plane. For an object element at the centre of the object area, r = 2d. Thus, worst case resolution D = 1.2λR/2d.

In regard to receiver array resolution, system resolution is influenced by the dimensions of the transmitter/receiver array 1 and by the wavelength of the radiation emitted by the transmitter. Referring to FIG. 18, position information is received from an object 0 during the time $t_r$ it takes for an echo to propagate along the line portion 1.

$$t_r = 1/c = 4d/c \sin \alpha.$$

α represents the aperture of the transmitter-receiver array. In this time L bits of binary (echo/no echo) information must be stored. 2L bits of ternary (+, 0, −) information can be stored in 2 banks of shift registers in time $t_r$. The receiver shift register clock frequency $f_c$ must be $$f_c = L/t_r$$

If an array is to resolve N distinct object elements per equitime surface, M receivers are required, where N<kM. k has a value of about unity. N must not be greater than M, otherwise image contrast falls to zero.

For imaging one or a small number N of object elements, M is chosen to be small. If N is large many receivers must be used and image frame rate will necessarily be slower than when N is small.

In order to optimise the choice of M, consider the case of imaging a plane structure, such as a grid, which is only present in the object plane. Then the maximum number of object elements will be the length of the longest equitime locus at the object plane divided by D, the object element dimension. (It is assumed that the equitime locus has a width of one element D in the object plane). If we arrange to irradiate only the zone we desire to image, of diameter φ, then $$N_{max} = \frac{\pi \phi}{D}$$

Clearly the smallest equitime locus consists of one element at the centre of the plane; so the average number of reflecting elements contributing to the image $$N = \frac{\pi \phi}{2D} = \frac{\pi L}{2} < M$$

If a plane in a medium occupied in depth and breadth by reflecting elements is to be imaged, the average number of elements on the equitime surface and not just the equitime locus in the object plane must be estimated to obtain a reasonable value for M.

There is set out in the following three design examples.

DESIGN EXAMPLE 1

An imaging system for imaging lattice structures in cloudy water, with

| Range R | 10 m |
|---|---|
| Aperture $\alpha$ | $\pm$ 10° ($\phi$ = 3.4 m) |
| Image Resolution L | 100 lines | i. Image resolution $D = \phi/L = 3.4\ c\ m$
ii. Choose 1 MHz pulse frequency, $C = 1.5 \times 10^3\ m\ s^{-1}$, so $\lambda = 1.5$ mm. To match object resolution to image resolution $$\frac{\phi}{L} = 1.2 \lambda \frac{R}{2d}$$

or $$d = 1.2 \lambda \frac{RL}{2\phi} = 27\ cm$$

So the required receiver array width $4d = 108\ cm$.
iii. Receiver time bracket $$t_r = 4 \frac{d}{c} \sin \alpha = 123\ \mu s$$

Shift register clock frequency $$f_c = \frac{L}{t_r} = 820\ kHz$$

For displaying phase imformation for optimum resolution, a (+, 0, −) ternary register requires $2L = 2 \times 100$ bits capacity.
iv. Out and return time for a pulse-echo cycle is $$2T = \frac{2R}{c} = 13\ ms$$

If the same clock frequency is kept for the read-in and read-out cycles, then the read-out cycle takes 123 $\mu s$ per channel.

Choose the number of channels read-in in parallel to be $n = 16$. Total read-out time is approximately 2 ms. This can be comfortably accomplished in one pulse-echo cycle.

$$M > N = \frac{\pi L}{2} \simeq 157 \tag{v}$$

If we assume that the lattice is very dense, then we will need $M \simeq 160$. If the lattice has a surface density of 50%, $M \simeq 80$. So a design choice of $M = 128$ is sufficient for practical purposes.

$$\text{Frame period} = 2T \frac{M}{n} = \frac{128}{16} \times 13 \tag{vi}$$

$$= 104\ ms$$

Thus the image will be complete in about $1/10^{th}$ sec. This will be sufficient for imaging in all but very turbulent water. By doubling the number of channels read in parallel the frame period can be halved, if necessary.

| Design Parameters | | |
|---|---|---|
| Operating wavelength | $\lambda$ | 1.5 mm |
| Array diameter | 4d | 108 cm |
| Number of Receivers | M | 128 |
| Channel multiplicity | n | 16 |
| Shift register frequency | | 820 kHz |
| Shift register capacity | | 2 × 100 per channel |
| Frame period | | 104 ms |
| Image Resolution | | 3.4 cm |

DESIGN EXAMPLE 2

A system for imaging objects, such as tools, submerged in liquid mud containing other reflecting objects to a density of 5% of the mud volume, with

| Range R | 2 m |
|---|---|
| Aperture $\alpha$ | $\pm 30°$ ($\phi$ = 1.16 m) |
| Resolution L | 100 lines |

PROCEDURE i. Image Resolution $\phi/L \simeq 1.2\ cm$
ii. Choose 1 MHz pulse frequency, so $\lambda = 1.5\ mm$ $$d = 1.2 \lambda\ RL/2\phi = 15\ cm$$

So receiver array diameter $4d = 60\ cm$
iii. Receiver Time bracket $$t_r = 4\ d/c\ \sin \alpha = 200\ \mu s$$

Shift register clock frequency $$f_c = L/t_r = 500\ kHz$$

Ternary shift register capacity $2L = 2 \times 100$ bits.
iv. Pulse echo cycle $2T = 2\ R/c \simeq 2.7\ ms$ If we read-in and read-out the shift register at the same frequency $f_c$, then read-out time is 200 $\mu s$ per channel. If we let the channel multiplicity $n = 8$, then read-out time is $8 \times 200\ \mu s = 1.6\ ms$ which can be accommodated in the pulse echo cycle of 2.7 ms.

v. If only the imaged area is insonified, then the maximum area of insonified equitime surface is $\pi\ (\phi/2)^2$, containing $\pi(\phi/2D)^2 = \pi/4L^2$ object elements, of which reflections come from $N \approx 0.05\ \pi/4L^2 = 392$ Here the equitime surface always contains about the same number of elements. So for statistical resolution choose the number of receivers $M = 512$.

vi. Then frame period $= M/n \times 2.7 = 172\ ms$

| Design Parameters | | |
|---|---|---|
| Operating wavelength | $\lambda$ | 1.5 mm |

-continued

| Design Parameters | | |
|---|---|---|
| Array Diameter | 4d | 60 cm |
| Number of Receivers | M | 512 |
| Channel Multiplicity | n | 8 |
| Shift register frequency | | 500 kHz |
| Shift register capacity | | 2 × 100 bits per channel |
| Frame Period | | 172 ms |
| Image Resolution | | 1.2 cm |

(For the sake of economy the shift register system could be dropped; the frame period would then be 1.4 secs).

For imaging at long range, where $\phi >> 4d$, an additional requirement is that each spiral centre in the image plane should be separated by at least one resolution line from other spiral centres. If this is not respected, then their brightened spirals will be indistinguishable in the image plane.

DESIGN EXAMPLE 3

A system operable, to produce a radar position image (single spot) of an aeroplane, with

| Range R | 5 Km |
|---|---|
| Aperture $\alpha$ | ±5° ($\phi$ = 880 m) |
| Image resolution L | 100 lines |

PROCEDURE

In this case the pulse velocity is that of light.

$c = 3 \times 10^8 \, ms^{-1}$. Choose $\lambda = 1 \, cm$ i. Image Resolution = $\phi/L \simeq 9 \, m$ This is sufficient to resolve the wingspan of a small plane.

ii. Object resolution $$D = 1.2\lambda R/2d = \phi/L$$

so minimum $$d = 1.2 \, \lambda \, RL/2\phi = 3.5 \, m$$

So receiver array diameter $4d > 14 \, m$ iii. Time bracket for information reception $$t_r = 4d/c \sin \alpha = 5 \, ns$$

This time bracket must be resolved into L subdivisions of 50 picoseconds each: this is achieved by transmitting in each receiver cycle L pulses at intervals greater than $t_r$, say with 20 ns interval between pulses, plus 1 pulse to trigger the timing system. As described, the sampling unit 44 scans the time bracket $t_r$ taking a 50 picosecond sample during each of 100 consecutive received echo pulses. Thus the transmitter sends a train of 100 pulses at intervals of 20 ns, i.e. for each receiver channel the reception time is approximately 2 $\mu$ secs.

iv. Since it is foreseen that only one reflecting element will lie on any equitime surface, (ground echoes can be excluded by doppler shift filtering if necessary), so N = 1. The minimum possible value of M is 2; but M = 4 or 8 is preferable in order to sharpen the image point definition. Choose M = 8.

v. Array diameter of 14 $m$ represents only 1½ resolution lines. This will give a very aberrated image point resolution. To usefully accomodate 8 channels, we need 3 × 3 lines spread for the spiral centres; giving minimum useful array diameter $4d = 3\phi/L = 27m$ vi. Pulse-echo time $2T = 2R/c = 33 \, \mu s$ Echo read-in time 2 $\mu$ secs.

Thus total time to read-in an image is 8 × (33 + 2) = 280$\mu s$. (In 280 $\mu s$ a plane travelling at 1000 Km/hr across the object plane moves less than 10 cm, so object motion will not further degrade the resolution of 9 m).

vii. It is convenient to restrict the spiral display frequency to about 3 MHz, and the shift registers may be read out with a clock frequency of 1 MHz, giving a read-out cycle of 8 × 100 × 1 = 800 $\mu s$.

Thus a frame period of 800 + 280 = 1080 $\mu s$, giving a frame rate of about 900 per second, is feasible.

| Design Parameters | | |
|---|---|---|
| Radar Wavelength | $\lambda$ | 1 cm |
| Array diameter | 4d | 27 m |
| Number of Receivers M | | 8 |
| Transmitted pulse code | | (8 × 100) + 1 pulses at 20 ns interval. |
| Sampling resolution | | 50 picosecs. |
| Shift registers | read-in clock frequency | 50 MHz |
| | read-out clock frequency | 1 MHz |
| | capacity | 100 bits |
| Object resolution | | 9 m |
| Frame period | | 1.1 msec. |

It is to be appreciated that the imaging systems described hereinbefore have been described by way of example only.

Another example of an imaging system in accordance with the said second aspect of the invention is for imaging a spherical surface. Such a system may be a wide-angle long range system such as might be used in oceanography. This other example comprises a transmitter for transmitting a spherically diverging wave from the centre of the transmitter-receiver array. In this case, the equitime locus on the spherical object surface is a circle in a plane orthogonal to the axis joining the transmitter and receiver: the projection of this locus into the image screen is a straight line.

Figure 19:
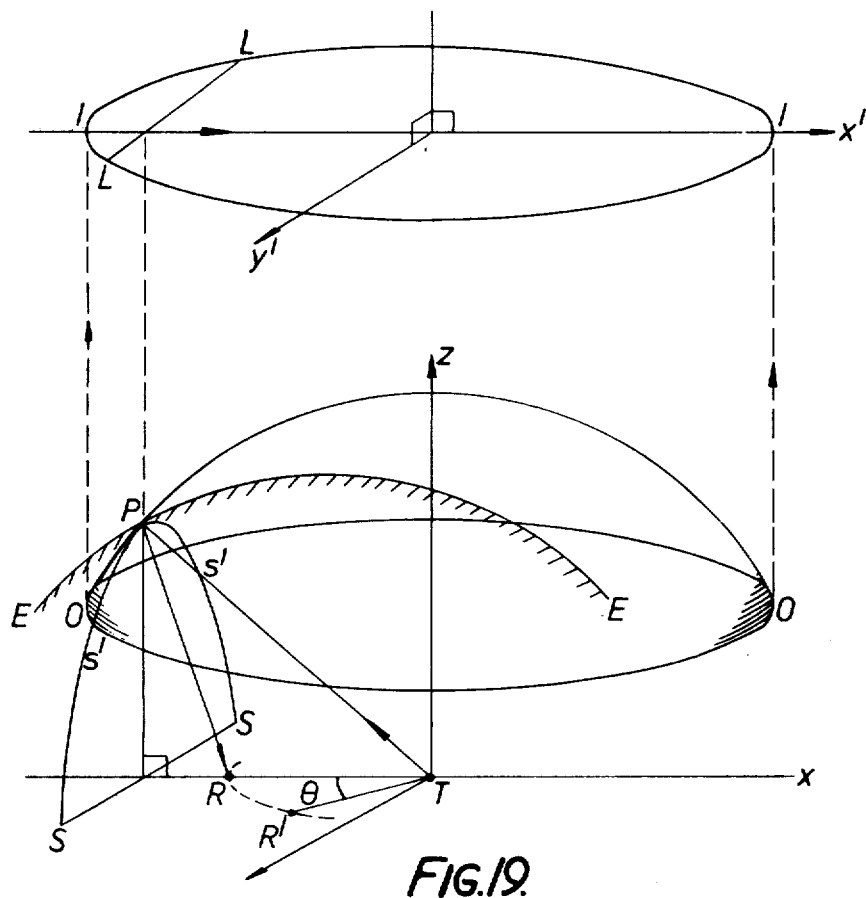
FIG. 19 shows the relation between the object focal surface, equitime surface, and equitime line in the image of a hemispherical object focal surface.

FIG. 19 illustrates the principle of this imaging process. Transmitter T sends a pulse which is reflected from point P, in the desired hemispherical cap object focal surface OO, to be received by the receiver R. The equitime surface corresponding to the positions R, T, and the particular time delay is an ellipsoid of rotation EE about the $x$ axis, with focii at R, T. The intersection of this equitime surface with OO is in the arc S'S' of the semicircle SS, which semicircle is orthogonal to the $x$ axis. S'S' therefore projects into the image plane II as the straight line LL. (The image plane is thus a flat projection of a hemispherical cap object focal surface). With increasing delay of echoes arriving at R, the equitime line LL is drawn successively at positions moving from left to right on the $x'$ axis. The rate of advance of the equitime line is, to a good approximation, constant.

To do this the time base arrangement synthesises a voltage proportional to $$F'(u) = \frac{cR_1}{B_0}$$

where $R_1$ is the radius of the image and $B_0$ is the distance from the transmitter to the particular receiver to which the line relates. The integral of this voltage controls the position of the line in the image.

The timing is arranged so that the line always passes a distance from the image centre given by $$x = B_0 R_1/2R \cdot k$$

at the time $t = 2R/c$
where $k$ is a factor of value just less than one which optimises the focus.

Figure 20:
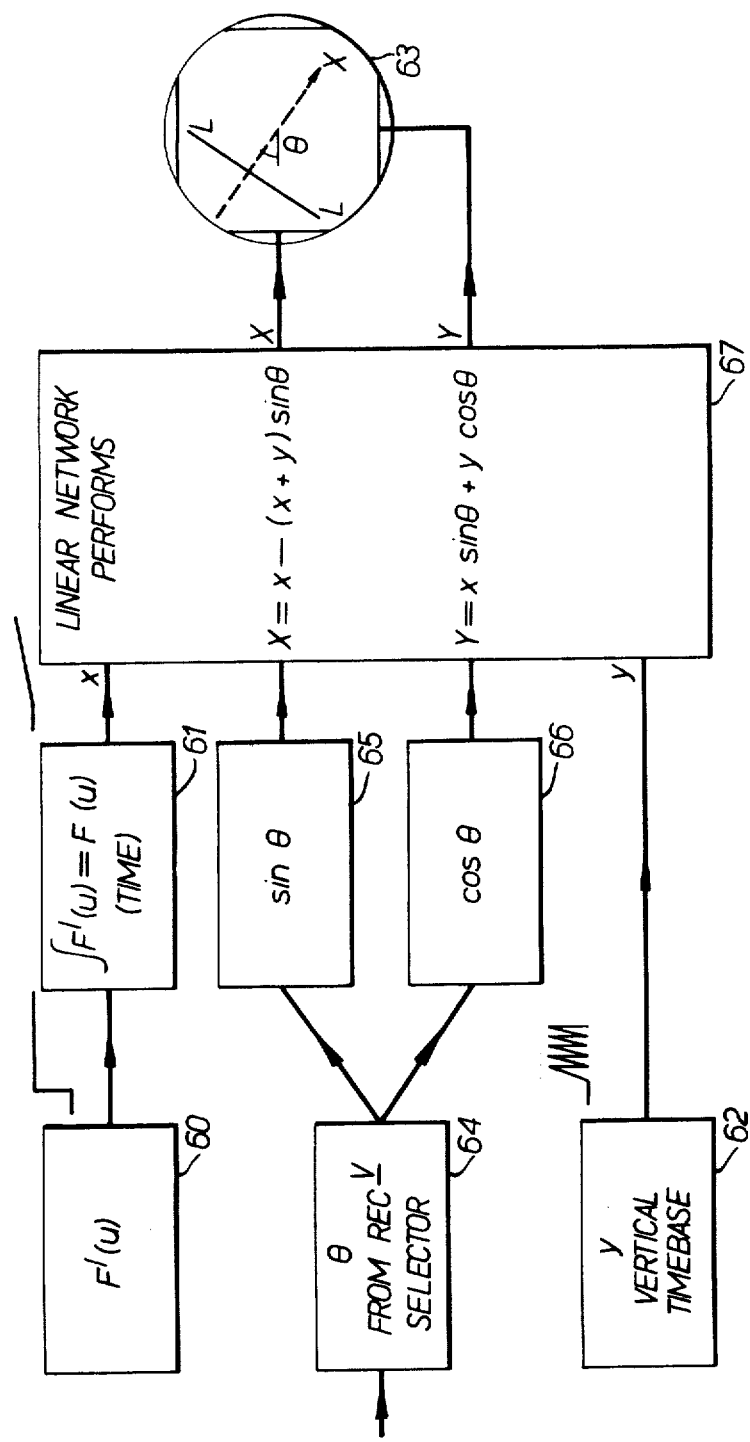
FIG. 20 is a block diagram of a time base arrangement for imaging a hemispherical object focal surface.

FIG. 20 shows an example of a means of synthesising the required timebase functions. A voltage proportional to $F'(u)$ is generated (60) and integrated (61) giving $x = F(u)$, which increases the required displacement of the line LL along the $x'$ axis. An orthogonal $y'$ displacement is generated by the timebase (62). Trace rotation, to generate the correct displacements on the image screen (63) when receiver R', displaced angularly by 0 in the receiver array from the $x$ axis, is in use, is generated in the following manner. A signal proportional to $\theta$ is generated (65), which in turn generates signals proportional to sin $\theta$, cos $\theta$ (65, 66). A linear network (67) synthesises $$X = x - (x + y) \sin \theta$$

$$Y = x \sin \theta + y \cos \theta$$

X and Y are then used to drive the horizontal and vertical deflections of the image display C.R.O.

Beam brightening of LL is performed on receipt of echo signals in the same manner as for plane object focal surface systems.

An imaging system in accordance with the invention may be constructed for imaging respective ones of a plurality of different object surfaces, with each of which a different equitime locus is associated. In such a system no change of transmitter-receiver array is required. The time base arrangement of the system is arranged to cause scanning according to respective ones of differnt scanning patterns representing the respective different equitime loci. A switch arrangement is provided for switching from one scanning pattern to another.

The scanning patterns are determined by geometric considerations dependent upon the particular object surface to be imaged and thus on the particular optical properties required.

In summary, an object to be imaged is irradiated by a pulse of sonic or electromagnetic radiation. Echoes are received by an array of receivers. Reception of an echo at one receiver causes a bright line to be traced on the image screen; this line is the projection into the image screen of the locus of all points, in the desired object focal surface, at which a reflecting object might lie to give rise to an echo received at that particular instant. Such an equitime locus passes through all points in the object focal surface for which the total path length from the transmitter, via this object surface, to the receiver is constant. Reception of a train of echo pulses results in a series of brightened lines being traced on the image screen. By repeating this process with many receivers in different positions, intersections of lines will occur at positions on the image screen corresponding to reflecting regions in the object, thus causing brighter illumination of these image points. Background illumination may be suppressed by charge substraction from the image screen, leaving a clear image.

It is to be appreciated that an imaging system in accordance with the said one aspect of the invention could comprise an arrangement in which lines representing the equitime loci are simulated to establish the points of section of the loci. In such an arrangement equations representing the equitime loci could be set up; and in conjunction with echo information received by the receivers, the equations could be simultaneously solved to find the intersections of the loci representing object elements.

The complete set of intersections only could then be displayed on the imaging screen. There would be displayed only those intersections substantially at which there are more than a predetermined number of loci. Thus, spurious echoes resulting in intersections between e.g. only two loci would not be displayed.

Figure 21:
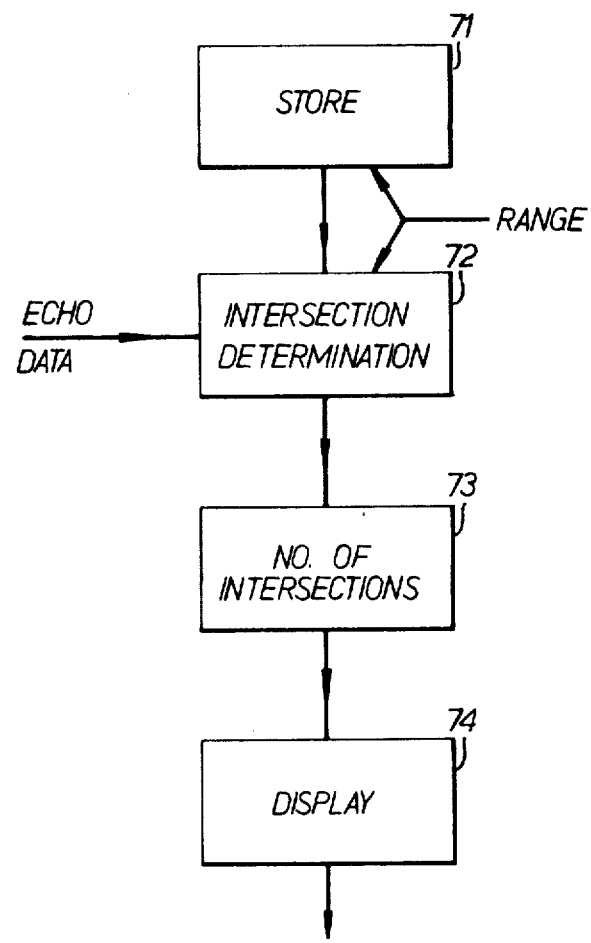
FIG. 21 is a schematic of a computer.

A computer would be required to solve the set of equations. The more detailed the image to be formed the larger the set of equations and thus a computer of correspondingly greater power is required. A possibly advantageous application of this form of system is to long range imaging of an object plane which is very much wider than the receiver array. A schematic of such a computer is shown in FIG. 21, in which a store 71 stores information, in form of an equation, defining the form of equitime loci. In conjunction with information as to range of the transmitter-receiver array from an object surface, the information defines the loci. The range information can be part of the stored information or be supplied automatically by detecting the time taken by a transmitted pulse to return to the array. The intersections are determined in a unit 72. A unit 73 determines the number of loci substantially at each intersection, i.e. the number of loci intersecting within a given range of a point in the image plane and selects those intersections at which more than a predetermined number of loci intersect. A device 74 then causes the display of the intersections selected by unit 73.

We claim:

1. An imaging control arrangement for use with a transmission-reception means for transmitting pulses, which means has an array of receivers for receiving transmitted pulses after reflection and with imaging means for displaying in an image plane an image representing an object surface, the imaging control arrangement having:

an input arrangement for receiving from the transmission-reception means echo signals conveying echo data relating to the distance away of reflective elements;

an output arrangement for connection to the imaging means to feed control signals thereto;

and, connected between the input and output arrangements, signal processing means for receiving the echo data and for defining therefrom, and from range information relating to the range of the object surface to be imaged, equitime loci in the object surface corresponding to the echo data, the equitime loci being the loci of all those object elements in the object plane which would give the same pulse transmission time from the transmitter to the object plane and back to the receiver, the signal processing means being operable to produce from these defined equitime loci said control signals for the imaging means such as to cause the display in the image plane of a plurality of image elements representing reflective elements substantially in the object surface by displaying image elements at positions corresponding to intersections of these equitime loci.

2. An arrangement according to claim 1, comprising computing means having:
a store in which is stored equation information which, in conjunction with range information relating to the range of the object surface from the transmission-reception means, defines sets of equations describing said loci;
means for determining from the range and equation information and from said echo data the intersections of those of the loci which the computing means determines as corresponding to said data;
means for determining, on the basis of the number of loci substantially at each intersection, the positions of image elements corresponding to reflective object elements substantially in the object surface; and
means for producing, on the basis of the determined positions, said control signals for causing the display in the image plane of the image elements.

3. An arrangement according to claim 1, operable to cause the display of image elements by causing the display in the image plane of representations of the equitime loci corresponding to the echo data so that displayed loci reinforce each other at intersections thereof, whereby the intersections correspond in positions to reflective object elements.

4. An arrangement according to claim 1, which is operable to take echo data from each of the receivers in turn and to cause that data to be displayed at all places in the image plane corresponding to places of object elements in the object surface from which the echo data could have originated.

5. An arrangement according to claim 1, wherein the signal processing means is operable to produce a first set of control signals for controlling a scanning operation by an imaging means so that a scanning operation takes place according to a particular pattern, which operation can be effected relative to each of a plurality of points in the image plane, which points are the projected positions of the receivers into the image plane, the signal processing means also being operable to produce further control signals for selectively activating picture elements of an imaging means in accordance with said echo data so that portions of the scanning patterns appear on the image plane as lines which represent said equitime loci of the object surface, whereby the intersections of the lines represent reflective object elements.

6. An arrangement according to claim 5, wherein the signal processing means comprises:
a time base operable to produce the first set of control signals for causing scanning by the imaging means to take place relative to each of the plurality of points, the scanning following for each point a particular pattern representing a group of equitime loci; and
sequencing means for receiving the echo signals from the receivers and for feeding the signals in a predetermined sequence to the imaging means as the further control signals, there being
timing means for synchronising the operation of the time base with the operation of the sequencing means so that the echo data is stored at all places in the image plane corresponding to places in the object plane from which it could have originated.

7. An arrangement according to claim 6, wherein the timing means has an output for controlling the transmission of pulses from the transmission-reception means, so that a sequence of pulses are transmitted, and wherein the sequencing means comprises a plurality of inputs for receiving echo signals and an output, the sequencing means being operable independence upon the timing means to connect in predetermined sequence each input in turn to the output, the arrangement being such that echo signals corresponding to the transmitted pulses are sequentially received at the inputs and sequentially fed to the output.

8. An arrangement according to claim 6, wherein the sequencing means comprises a plurality of inputs for receiving echo signals, storage means coupled to the inputs for storing echo data represented by the echo signals, and reading control means for controlling the reading in and reading out of data to and from the storage means, the reading control means being arranged to be controlled by said timing means for synchronizing the operation of the reading control means with said scanning operations, the arrangement being such that echo data can be read into the storage means in parallel from the plurality of receivers and the data can be read out of the storage means serially.

9. An arrangement according to claim 8, comprising a digitiser for receiving the echo signals and for producing therefrom the echo data in digital form suitable for storing in shift registers.

10. An arrangement according to claim 9, wherein the digitiser produces said echo data in ternary form.

11. An arrangement according to claim 9, wherein the storage means comprises a plurality of shift registers coupled to the respective inputs, there being a clock for clocking the shift registers which clock is so controlled by the reading control means that the clock rate is greater for reading data in to the shift register than for reading data out of the shift register.

12. An arrangement according to claim 6, wherein the timing means comprises a clock for producing a periodic signal having a repetition rate related to the range of the object surface from the transmission-reception means, the scanning patterns being controlled in dependence upon said repetition rate such that the rate of advance of a scanning pattern in relation to its associated point of the imaging means is a function of said repetition rate.

13. An arrangement according to claim 12, wherein the timing means comprises a range timer operable to produce a range signal of value related to the time elapsed between transmission of a pulse and the first reception of an echo, the clock being coupled to receive the range signal and to produce the periodic signal with a repetition rate related to the value of the range signal.

14. An arrangement according claim 6, wherein the time base is operable to cause scanning of the imaging means to take place for each of the plurality of points with a pattern of spiral form, which spiral form pattern advances across the image plane from the point at a rate which is a hyperbolic function of range of the object surface from the transmission-reception means.

15. An arrangement according to claim 14, wherein the time base is arranged to cause the spiral form patterns to be centred on respective ones of said plurality of points of the imaging screen, which points correspond to the projected positions on the image plane of the receivers.

16. An arrangement according to claim 14, wherein the time base is arranged to cause the spiral form scanning patterns to be centred on respective ones of a plurality of points, which points are each substantially half-way between the projected positions on the image plane of the transmitter and a respective one of the receivers, the spiral form pattern centred on each point advancing across the image plane from that point at a rate which is a hyperbolic function of range of the object surface from the transmitter and of the distance of the respective receiver from the transmitter.

17. An arrangement according to claim 16, wherein the time base comprises:
an oscillator for producing an oscillatory signal for defining the rate of orbiting of the spiral form patterns about each of said points;
signal producing means for producing a modulating signal the value of which is a hyperbolic function of time for modulating the oscillatory signal;
modulating means for amplitude modulating the oscillatory signal with the modulating signal;
a phase shifting means connected to the modulating means for producing two modulated oscillatory signals differing in phase by 90°; and
positioning means for adding to each of the phase shifted modulated signals d.c. voltages for causing scanning to take place in relation to each of said plurality of points in the image plane, the positioning means being controlled by the timing means such that scanning takes place for each of said points in turn.

18. An arrangement according to claim 17, wherein the signal producing means is also controlled by the timing means such that the value of the modulating signal varies with time according to a different hyperbolic function for each of said points of the imaging plane.

19. An arrangement according to claim 6, wherein the transmission-reception means is operable to cause scanning by the imaging means in relation to each of the plurality of points to take place with a scanning pattern comprising a straight line perpendicular to the line joining the projection into the image plane of the transmitter and the respective one of the receivers, the line advancing towards the point of projection into the image plane of the transmitter at a constant rate which is a function of the range of the object surface from the transmission-reception means.

20. An arrangement according to claim 6 for use with an imaging means having a cathode-ray-tube, wherein the signal processing means comprises means operable periodically at times defined by the timing means to produce a control signal for causing the subtraction of a predetermined amount of charge from the imaging screen to reduce background illumination.

21. An arrangement according to claim 1 in combination with an imaging means.

22. An arrangement according to claim 21, wherein the imaging means comprises a cathode-ray-tube.

23. An arrangement according to claim 1 in combination with a transmission-reception means for transmitting a pulse and having an array of receivers.

24. A method of producing on an imaging screen of an imaging means a plurality of image elements corresponding to reflective object elements of an object surface, in which method:
a pulse is transmitted;
echo data relating to the time of travel of a pulse between transmission and reception after reflection at a reflective object element is produced;
equitime loci of the object surface corresponding to the echo data and to the range of the object surface are determined;
the intersections of the equitime loci are determined; and image elements are displayed on the screen at positions corresponding to these intersections.

* * * * *